(12) United States Patent
Laporte

(10) Patent No.: US 6,648,409 B1
(45) Date of Patent: Nov. 18, 2003

(54) MOTOR VEHICLE SEAT PART COMPRISING AN ANTI-SUBMARINING CROSSPIECE

(75) Inventor: Alain Laporte, Guyancourt (FR)

(73) Assignee: Faurecia Sieges d'Automobile S.A., Boulogne (FR)

( * ) Notice: Subject to any disclaimer, the term of this patent is extended or adjusted under 35 U.S.C. 154(b) by 0 days.

(21) Appl. No.: 09/831,939

(22) PCT Filed: Sep. 11, 2000

(86) PCT No.: PCT/FR00/02496

§ 371 (c)(1),
(2), (4) Date: May 16, 2001

(87) PCT Pub. No.: WO01/19641

PCT Pub. Date: Mar. 22, 2001

(30) Foreign Application Priority Data

Sep. 16, 1999 (FR) .............................................. 99 11710

(51) Int. Cl.⁷ .............................................. B60N 2/427
(52) U.S. Cl. .............................. 297/216.1; 297/216.19; 297/284.11
(58) Field of Search ....................... 297/216.1, 216.19, 297/284.11

(56) References Cited

U.S. PATENT DOCUMENTS

| | | | |
|---|---|---|---|
| 3,578,376 A | * 5/1971 | Hasegawa et al. | 296/68.1 |
| 3,724,603 A | * 4/1973 | Shiomi et al. | 188/371 |
| 4,334,709 A | * 6/1982 | Akiyama et al. | 297/284.11 |
| 5,567,006 A | * 10/1996 | McCarthy | 297/216.15 |
| 6,050,635 A | * 4/2000 | Pajon et al. | 297/216.1 |
| 6,113,185 A | * 9/2000 | Yamaguchi et al. | 297/216.1 |
| 6,254,181 B1 | * 7/2001 | Aufrere et al. | 297/216.1 |
| 6,386,631 B1 | * 5/2002 | Masuda et al. | 297/216.1 |

FOREIGN PATENT DOCUMENTS

| | | | |
|---|---|---|---|
| DE | 4129497 A1 | * | 3/1993 |
| FR | WO 97 37869 A1 | * | 10/1997 |
| GB | 2537030 A | * | 6/2001 |

* cited by examiner

Primary Examiner—Peter R. Brown
Assistant Examiner—Joe Edell
(74) Attorney, Agent, or Firm—Connolly Bove Lodge & Hutz LLP

(57) ABSTRACT

A seat pan of an automobile vehicle seat includes an anti-sub-marining cross member to limit the movement of a pelvis of a user towards the front of the seat, the cross member extending crosswise to a seat pan framework and being able to move towards the front while exerting pelvis retention forces during the movement of the pelvis and cross member towards the front of the seat. The seat pan includes energy dissipation means to control, from a predetermined threshold, forces transmitted by the cross member to the occupant of the seat. The ends of the cross member are connected to links that pivot on the seat pan framework about an axis passing through lower ends of said links so that the movement of the cross member towards the front is in the form of an arc of a circle, defined by the pivoting of the links towards the front, opposing the retention force exerted by the energy dissipation means which are connected to upper ends of the links and near the cross member.

8 Claims, 6 Drawing Sheets

MOTOR VEHICLE SEAT PART COMPRISING AN ANTI-SUBMARINING CROSSPIECE

FIELD OF THE INVENTION

The invention concerns an automobile vehicle seat pan including an anti-sub-marining cross member.

BACKGROUND OF THE INVENTION

Conventionally, seat belts have an oblique portion and a ventral portion which are applied respectively with a certain tension against the chest and the pelvis of the person using the seat.

When a shock on the vehicle tends to throw the user towards the front of the vehicle, for example during an accident, the seat belt is blocked, in a manner known itself, to hold the user as firmly as possible against the seat. However, the user is then subjected to a high deceleration and, under his or her inertia, moves in relation to the belt. This movement can cause serious injuries to the body, in particular abdominal injuries, when the user's pelvis tends to pass under the ventral portion of the seat belt by the sliding of the user's buttocks on the seat pan. This phenomenon is generally called sub-marining.

To solve this problem, it is already known to use a transverse bar, also called "anti-sub-marining cross member" which is placed crosswise in the seat pan under the cushions of the seat. This bar is provided to limit, in the case described above, the movement of the user's pelvis towards the front of the seat and is designed so that it can distort under the force exerted by the pelvis to absorb a part of the movement energy. However, the possibility of movement corresponding to the deformation of the bar is then low. The result is that with a high energy absorption over a small movement, the forces on the pelvis of the passenger are necessarily high.

To improve this system, it has been planned, especially in document FR-A-2747080, to use an anti-submarining cross member which is placed crosswise in the seat pan, which extends during the shock to form an obstacle preventing the user's pelvis from moving and which then allows a certain movement of the pelvis under the control of energy absorption means.

In the system described in this document, the cross member is connected by its ends to supports formed of two triangular-shaped links installed so as to pivot on the seat pan framework. In rest position, the cross member is located at the level of the buttocks of the user and, during a shock, the cross member tilts upwards and towards the front of the seat pan under the action of a belt pyrotechnical pretensioner acting on the support links, to an extended position, to form an obstacle preventing the user's buttocks from moving forwards thus preventing the pelvis from passing under the ventral portion of the belt.

When the cross member is in extended position, the user's pelvis exerts a thrust on the cross member which may cause excessive compression of the user's lumbar region. Use of energy dissipation means are then provided to limit the force transmitted by the cross member to the user by enabling, from a predetermined threshold, progressive retraction of the cross member into the seat pan retaining but however enabling a certain movement of the pelvis.

The energy dissipation means are straight oblong grooves made along one of the sides of the triangular links in which the ends of the cross member slide. As the width of the said grooves is appreciably lower than the transverse dimension of the ends of the cross member, energy dissipation is obtained by the deformation of the edges of the groove by the ends of the cross member from a determined threshold.

The extension of the cross member is caused by the controlled pivoting of the links towards the front of the seat until they reach pivoting stop position in relation to the seat pan, then damping is obtained when the antisub-marining cross member moves itself in relation to the links.

This system therefore requires the use of several parts to control the movement of the bar at the time the shock occurs and the use of specific control means such as the pyrotechnical pretensioner mentioned above.

Moreover, as, during a shock, the cross member extends first, the energy absorption phase occurs after this and therefore with at least a slight delay. Also, the movement of the cross member in the grooves may be disturbed for instance if the cross member itself is deformed before it is effectively used at the time when the shock occurs.

BRIEF DESCRIPTION OF THE INVENTION

The purpose of this invention is to avoid these disadvantages and aims at proposing an anti-sub-marining cross member system which is simpler and therefore less expensive. It also aims at ensuring the absorption of the energy of the shock at earliest possible stage.

With these targets in mind, the subject of the invention is a seat pan for an automobile vehicle seat including an anti-sub-marining cross member to limit the movement of the pelvis of the user towards the front of the seat, the cross member extending crosswise to the seat pan framework and which can move towards the front, from a rest or extension position, while exerting pelvis retention forces during its movement towards the front of the seat, the seat pan including, for this purpose, energy dissipation means to control, from a predetermined threshold, said forces transmitted by the cross member to the occupant of the seat, the ends of the cross member being connected to links installed so as to pivot on the seat pan framework.

According to the invention, the seat pan is characterized in that the trajectory of the cross member during its movement towards the front is in the form of an arc of a circle defined by the pivoting of the links towards the front opposing the retention force exerted by the energy dissipation means.

As will be understood better later, the invention allows the system to be simplified to a considerable extent by avoiding the relative movements of the cross member in relation to the links, themselves pivoting, as, according to the invention, the ends of the cross member are rigidly attached to the links and it is the assembly formed by the links and the cross member which pivots in one block during the movements resulting from a shock.

According to a first specific arrangement, the rest position of the cross member is determined so that the cross member is submitted to the forces exerted by the user's pelvis when said forces reach said threshold and said energy dissipation means are placed between the cross member and the seat pan framework and shaped so as to act when the cross member starts to move under the effect of the forces exerted by the user.

If an accident occurs, the cross member then moves towards the front under the effect of the forces exerted on it by the pelvis of the user who, in such a case, tends to sink into the seat. The thrust force of the pelvis on the cross member is thus limited to a predetermined threshold so that, during the movement, the cross member is held in contact with the buttocks of the user whilst enabling a controlled and progressive movement of the pelvis.

The energy dissipation means act in the opposite direction to the said forces, by opposing a sufficient resistance to the movement of the cross member to gradually dissipate, for example according to a linear variation, the energy caused by the sudden deceleration of the user's body but however enabling the movement of the cross member to avoid lumbar injuries to the user due to overhigh compression forces.

According to a first design, the energy dissipation means include elements extendable by plastic deformation, connecting the cross member to the seat pan framework, these elements being arranged so as to enable the movement of the cross member towards the front of the seat when they are elongated and shaped so as to elongate by deforming plastically when the force exerted on the cross member reaches said threshold.

Preferentially, an extendable element will be used on each side of the seat pan to ensure, as far as possible, movement of the cross member parallel to itself by limiting the risks of the cross member becoming lopsided or over-centering in relation to the pivoting links and the seat pan framework.

These extendable elements are preferably attached, on the one hand, to the seat pan framework the cross member, or near to the end of the links and, on the other hand, to the seat pan framework and towards the rear of it. This arrangement allows a sufficient length to be given to the said extendable elements and therefore also provides them with a sufficient elongation capability. Moreover, they are preferentially placed against the side flanges of the seat pan framework the space they take up therefore limited.

Each extendable element consists preferentially of a strip, made of sheet steel for example, either corrugated transversely or including transverse cutouts.

For the corrugated strip, the energy absorption corresponds to the energy required to straighten, that is flatten, the strip. Note that the term corrugation must be taken in the largest possible sense, including all forms given to the strip by bending or folding operations reducing the distance between the ends when compared with the real length of the strip.

For a strip with transverse cutouts, the absorption corresponds to the energy required to deform the strip while remaining more or less in its plane, the way in which the strip deforms being in a way initiated and controlled by the arrangement and the shape of the cutouts which include, for example, cuts made in the center axial section of the strip but not through to the edges of the strip and which are moved apart by the deformation of the said edges during the elongation of the strip as will be seen later.

According to a second design, the energy dissipation means include a groove made in a flange of the seat pan framework, or in one of the links, into which is inserted a pin attached to one of the links or, respectively, to a flange of the seat pan framework, the width of the groove being appreciably lower than the transverse dimension of the pin, in such a way that the pin moves in the groove during the pivoting of the link by deforming the edges of the groove. The energy dissipation is then achieved in a similar manner to that which was described in the introduction of this paper but by different means. The overall size of the system of this design is then reduced and its installation especially simplified as will be clearly understood later.

According to a second specific arrangement, the energy dissipation means include at least one energy-dissipation pyrotechnical actuator connecting the cross member to the seat pan framework so that in a first phase, the actuator moves the cross member towards the rear then, in a second phase, enables the movement of the cross member towards the front by dissipating the energy supplied by the thrust force of the pelvis on the cross member.

Other characteristics and advantages will appear in the description which will be given of the various designs of a seat pan in compliance with the invention.

Refer to the appended drawings on which:

DETAILED DESCRIPTION OF THE INVENTION

Figure 1:
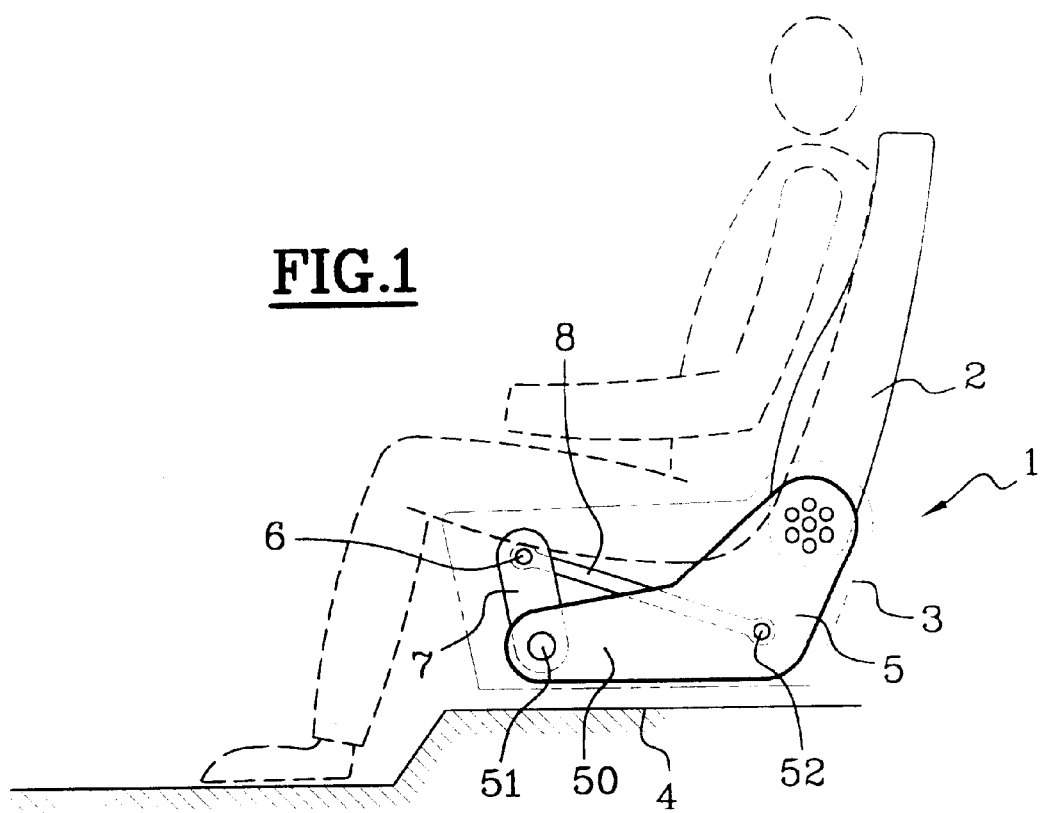
FIG. 1 is a schematic view of a seat in compliance with the invention and of its user in normal utilization position.
Figure 2:
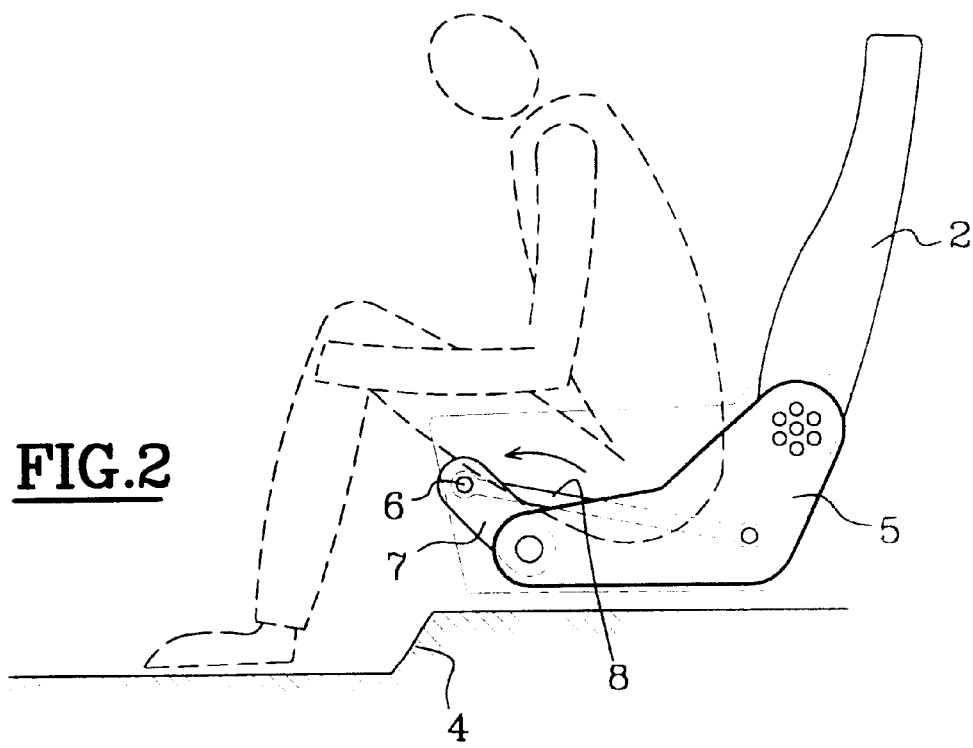
FIG. 2 is a corresponding view during a shock which moved the occupant towards the front.

The automobile vehicle seat 1, shown schematically on FIGS. 1 and 2, includes a backrest 2 hinged on the seat pan 3, this being attached to the floor 4 of the automobile vehicle in a manner known itself, for example by means of slides enabling longitudinal adjustment of the position of the seat.

The seat pan 3 includes a seat pan framework 5 and an anti-sub-marining cross member 6, for example a tube, which extends crosswise between the side flanges 50 of the seat pan framework. The cross member 6 is installed on the upper end of two links 7 installed so as to pivot in relation to the framework 5. The links are for example installed so as to pivot on a forward connecting cross member 51 connecting the two flanges 50.

In the design shown on FIGS. 1 to 8, the anti-sub-marining cross member 6 is also attached to the seat pan and held in position by two extendable elements 8 comprising the energy dissipation means, or shock absorbers, a front end 81 of which is in the form of a ring placed directly on the anti-sub-marining cross member 6 and the other end 82, towards the rear, is attached in the same way to the rear of the seat pan, for example to a rear connecting cross member 52 connecting the two flanges 50.

As will have already been understood, in case of a head-on shock on the vehicle, the pelvis of the occupant of the seat moves towards the front and presses against the anti-sub-marining cross member 6. The thrust force moves the cross member towards the front by pivoting of the links 7 towards the position shown on FIGS. 2, 4 and 6, by causing the elongation of the extendable elements 8 which undergo plastic deformation absorbing the kinetic energy of the user's body.

Figure 3:
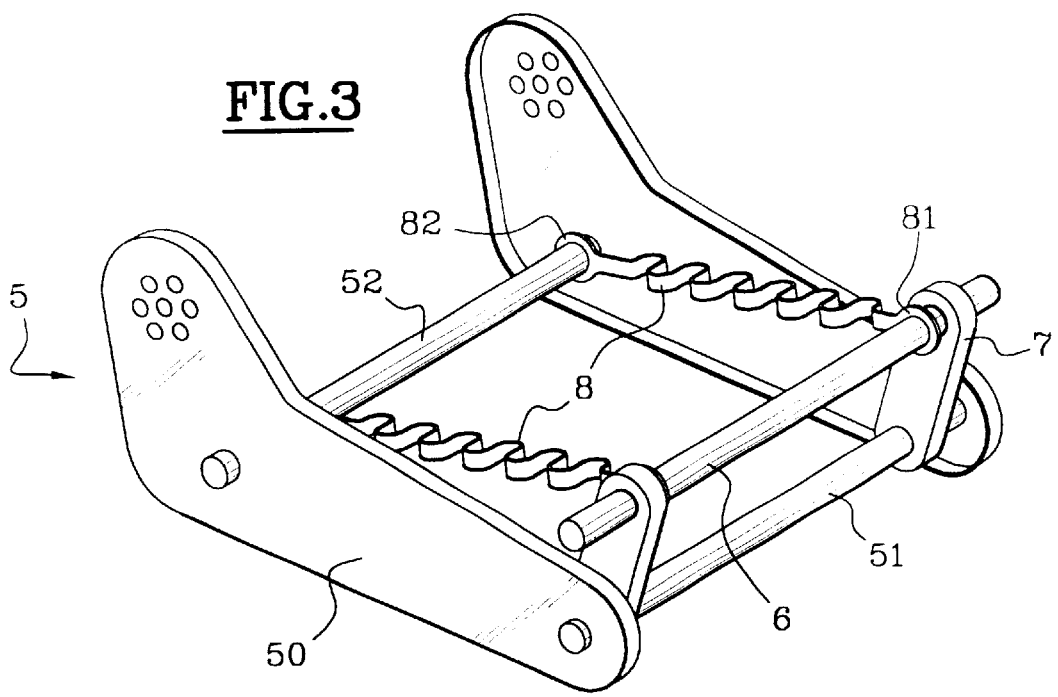
FIG. 3 is a perspective view of the seat pan framework with the anti-sub-marining cross member in seat normal utilization position.
Figure 4:
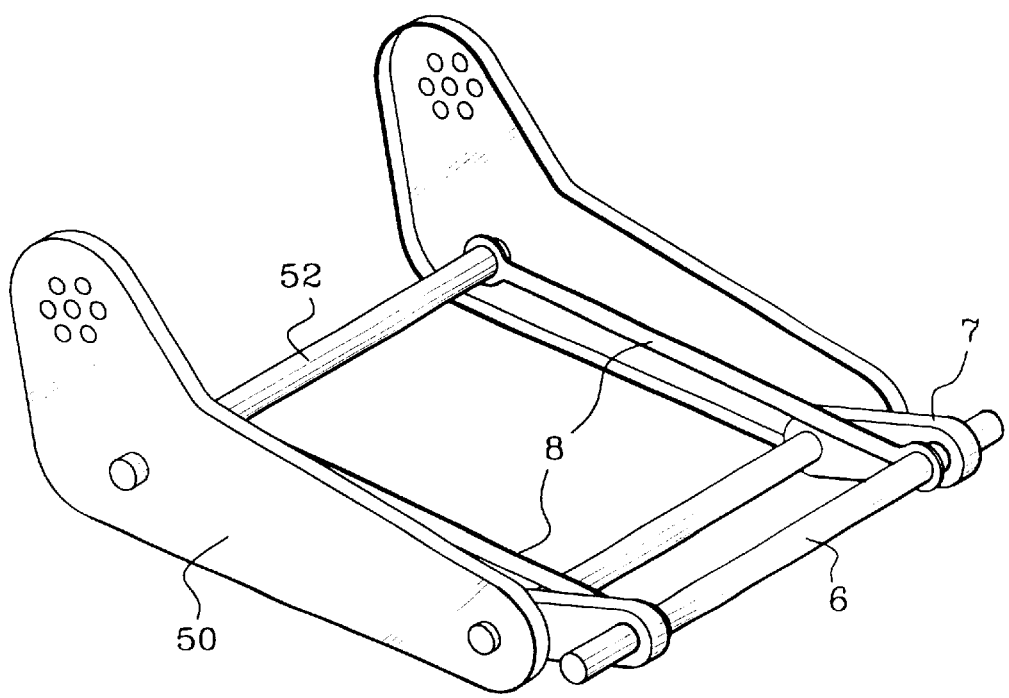
FIG. 4 is a view of the seat pan framework showing the position of the anti-sub-marining cross member after a shock.
Figure 7:
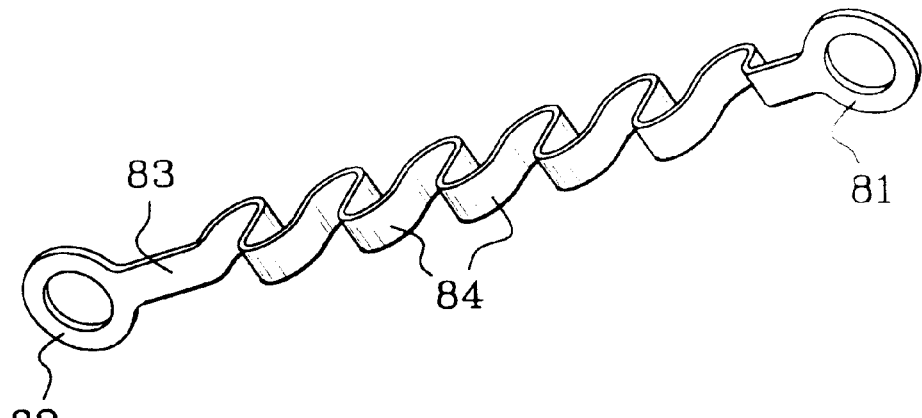
FIGS. 7 and 8 show perspective views of the deformable strips used as energy absorption means in the two above mentioned variants respectively.

The extendable elements 8 consist, in a first variant shown on FIGS. 3, 4 and 7, of a corrugated strip 83, made of steel for example. The corrugations represented on the figures can be obtained for example by performing alternate bending operations on an originally flat sheet. However, the shape, the number and the amplitude of the corrugations can be modified. For instance, the pitch or the amplitude of the corrugations could especially be varied on an element 8 to obtain a progressive energy absorption effect.

Figure 5:
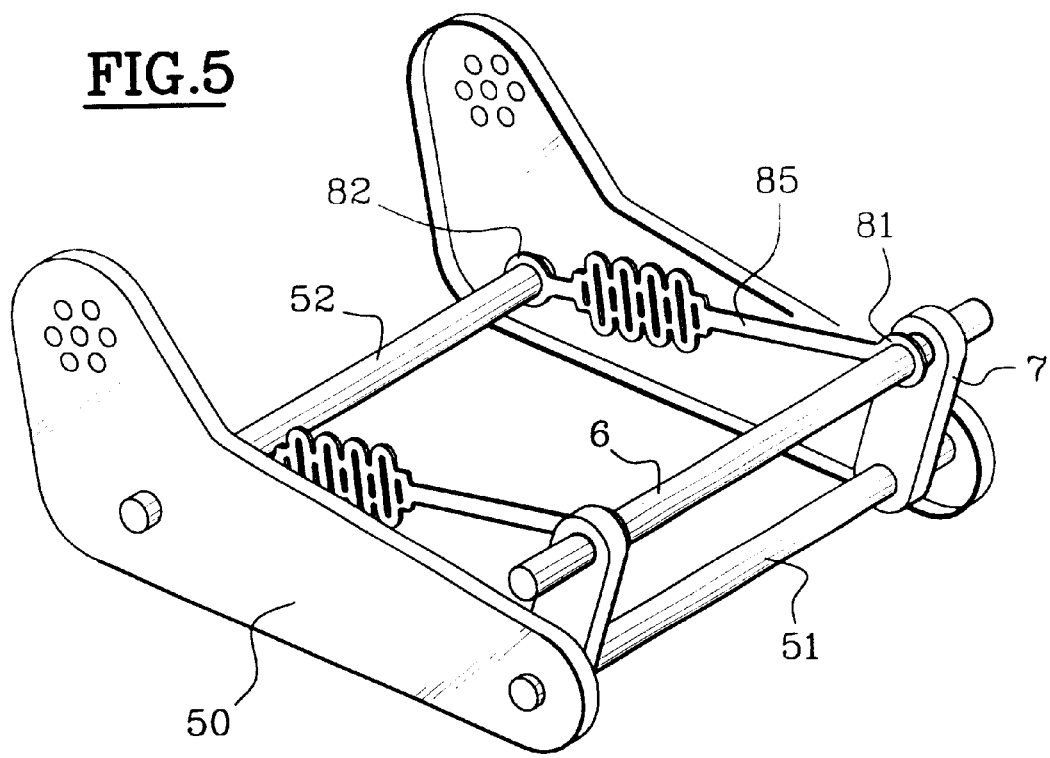
FIGS. 5 and 6 are the corresponding views of a design variant of the energy absorption means.
Figure 6:
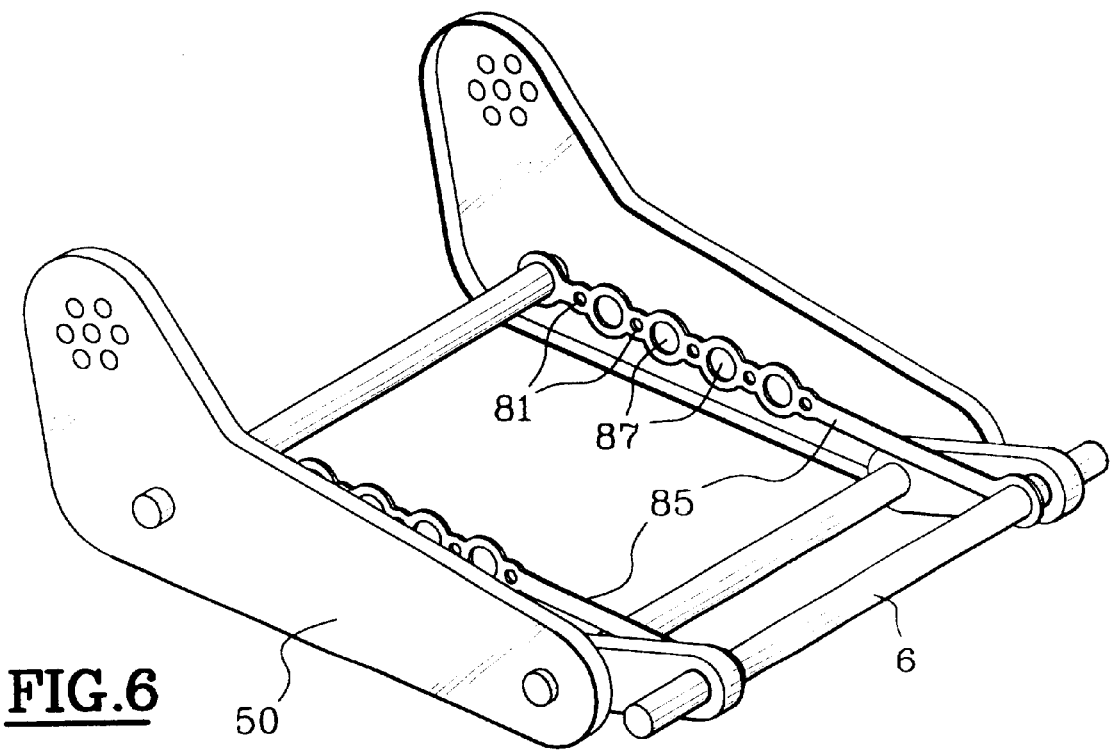
Figure 8:
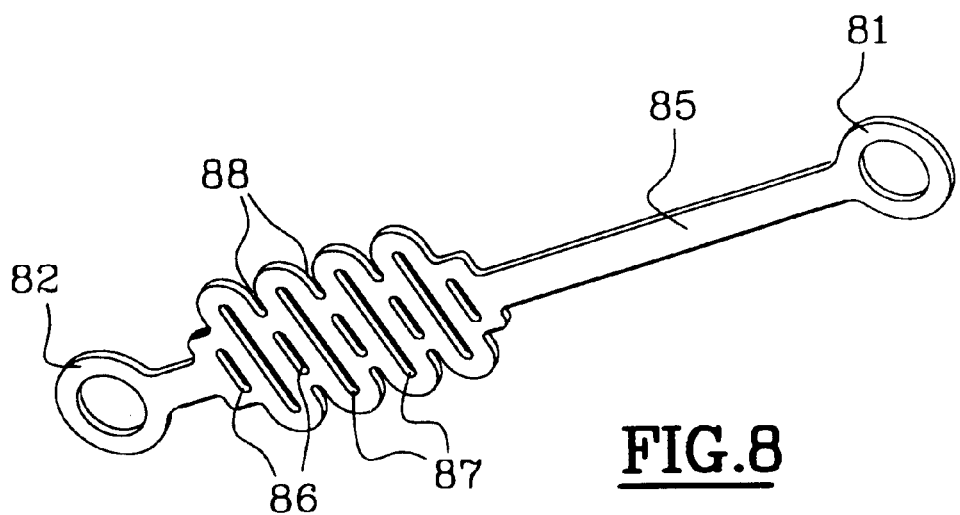

In another variant, shown on FIGS. 5, 6 and 8, the extendable elements 8 also consist of a strip 85, made of steel for example, but this time flat. The plastic deformation capability by elongation is obtained in this variant by transverse cutouts made in the strip as can be clearly seen on FIGS. 5 and 8. These cutouts especially include transverse slots 86, 87 which can be of different sizes, as shown on the drawings, and indentations 88 made on the edges of the strip. In the case of a shock, under the effect of the forces exerted by the pelvis of the seat occupant, the strip can be deformed by elongation, by moving apart and opening the said cutouts to form more or less circular orifices as shown on FIG. 6. This deformation consumes energy and therefore fulfills the required damping function.

Figure 9:
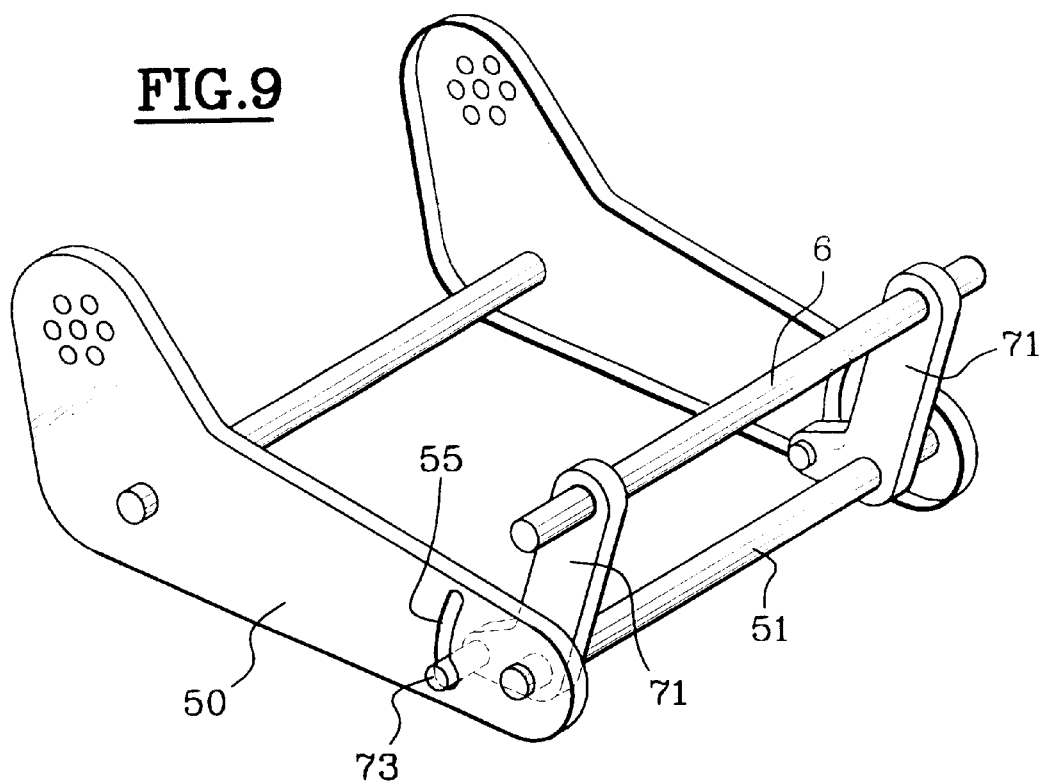
FIGS. 9 and 10 are a perspective views of the second design of the invention.
Figure 10:
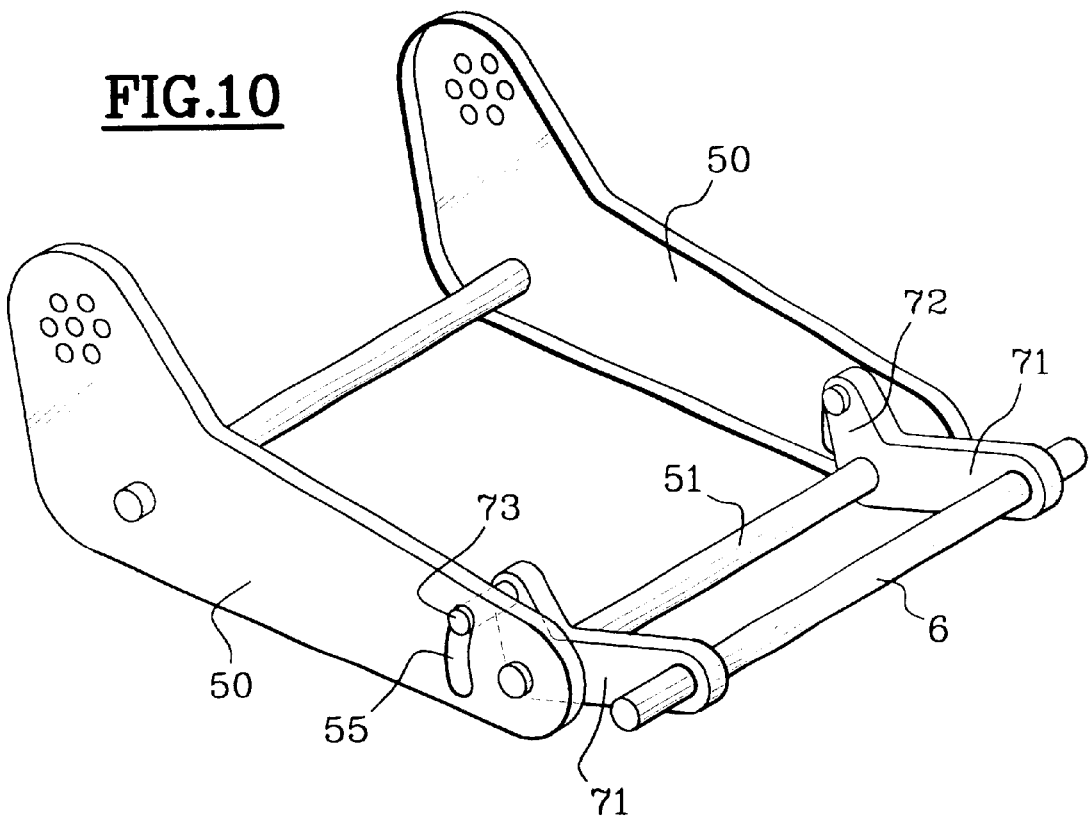

A second design of the invention is shown on FIGS. 9 and 10. In this design, the anti-sub-marining cross member 6 is installed on two arms 71 installed so as to pivot around the front connecting cross member 51, as in the first design. The arms 71 include an elbow section 72 which extends parallel to the flanges 50 of the seat pan framework, in the vicinity of these flanges. The elbow sections 72 each include a journal 73 which is inserted into a curved groove 55 made in the corresponding flange 50 and which can slide in the said groove when the arms 71 pivot towards the front. However, the diameter of the grooves 55 is appreciably smaller than the diameter of the journal 73 so as to dissipate energy by the friction on and the deformation of the edges of the groove when the journals 73 move upwards in the grooves in a manner similar to the energy dissipation effect mentioned in the introduction of this paper.

During a head-on shock, to avoid excessive compression of the user's lumbar region, the cross member can move gradually forwards and downwards under the pressure exerted by the user's pelvis while remaining held in contact with the user's thighs. The movement is controlled by the deformation of the edges of the groove 55 by the journals 73 from a determined threshold to maintain the force transmitted by the cross member 6 to the user of the seat within acceptable physical limits.

The invention is not limited to the designs described above. In particular, in the second design above, grooves could be made in the pivoting arms and the journals could be connected to the seat pan framework.

Also, other forms of energy dissipation means could be used.

Figure 11:
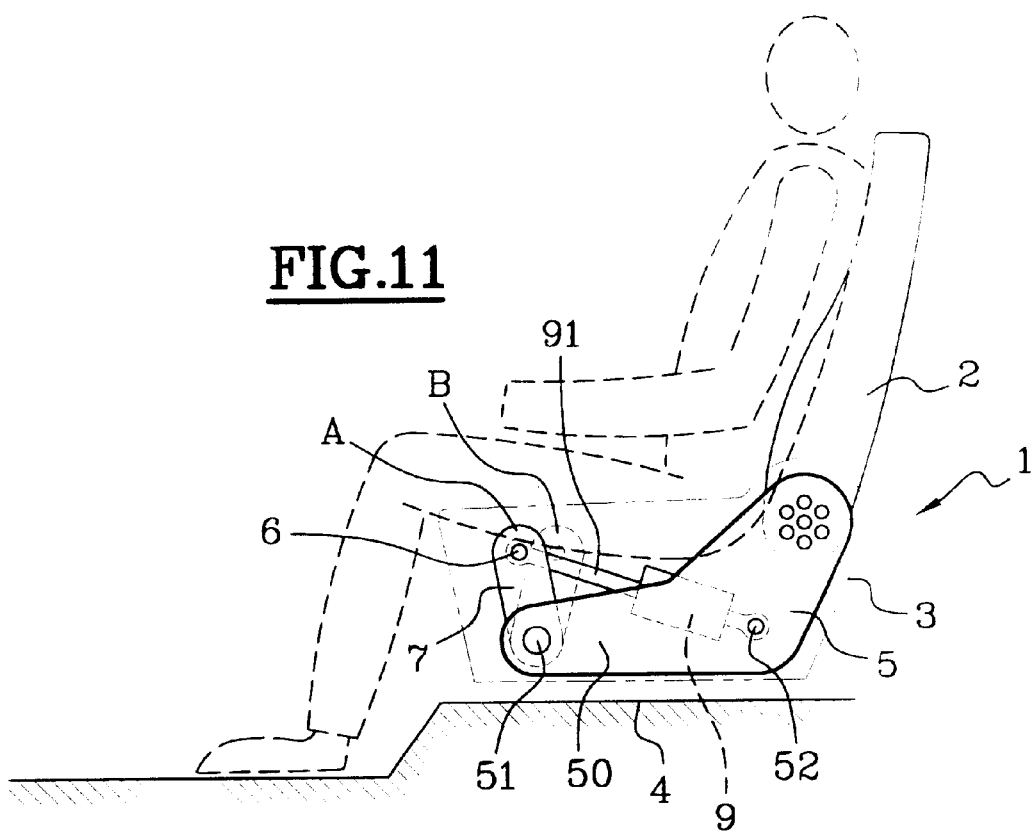
FIGS. 11 and 12 show a design variant for the arrangement using energy-dissipation pyrotechnical actuators.
Figure 12:
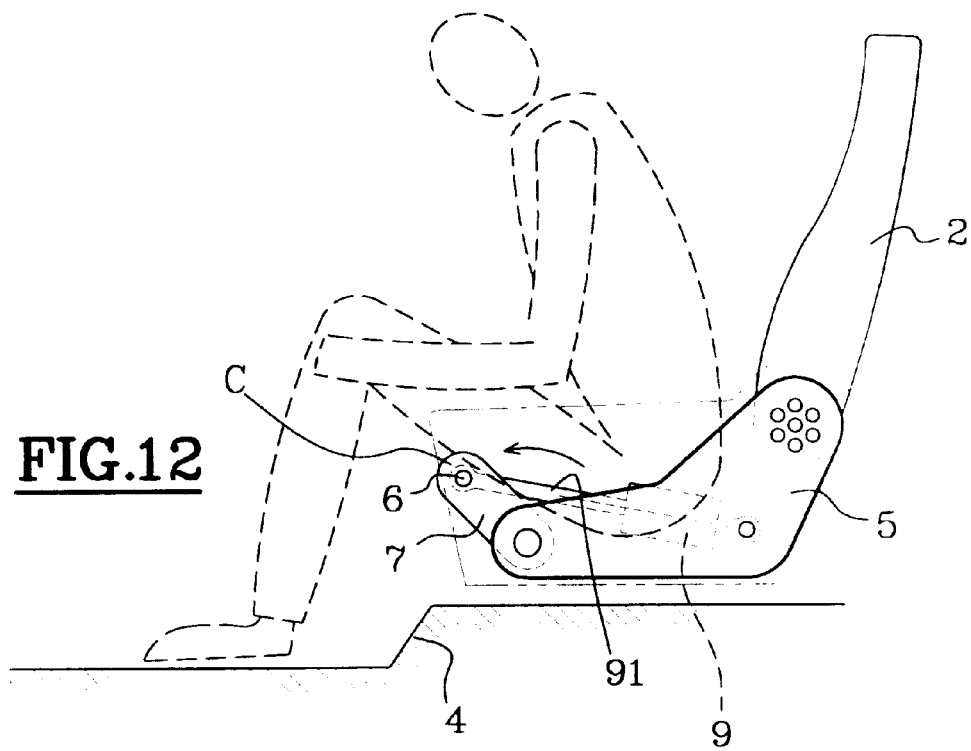

For example, according to the arrangement shown on FIGS. 11 and 12, these energy dissipation means consist of one or more energy-dissipation pyrotechnical actuators 9, such as known especially in documents U.S. Pat. No. 5,628,469, U.S. Pat. No. 5,495,790 and U.S. Pat. No. 5,526,996, the body of which is hinged on the seat pan framework and the rod 91 is connected to the cross member 6, for instance, on each side of the seat.

In the normal seat utilization position, the actuator 9 holds the cross member 6 in the rest position shown by position A of the link 7. When the vehicle is subjected to a shock, the pyrotechnical actuator is controlled and, by retracting its rod, causes the links to pivot towards the rear, to the position marked B. This movement allows the anti-sub-marining cross member to be very rapidly placed in the occupant's pelvis retention position. Then, the energy dissipation device integrated into the actuator enables the movement of the links and the cross member in opposite direction, towards the front, in compliance with the pelvis movement damping effect sought during deceleration. An advantage of using the energy-dissipation pyrotechnical actuator is that the movement of the cross member towards the rear is guaranteed before the energy dissipation phase starts which would not necessarily be obtained if, for example, a simple pyrotechnical actuator was used in combination with the energy dissipators described previously in the other designs, indeed, it would then be possible to compensate for the pyrotechnical actuator retraction effect by simultaneous deformation of the energy dissipators thus leaving the cross member in its rest position without the need to move towards the rear before the required energy dissipation phase.

What is claimed is:

1. A seat pan of an automobile vehicle seat and comprising:

an anti-sub-marining cross member to limit the movement of a pelvis of a user towards the front of the seat, the cross member extending crosswise to a seat pan framework and being able to move towards the front while exerting pelvis retention forces during the movement of said pelvis and cross member towards the front of the seat;

a seat pan including energy dissipation means to control, from a predetermined threshold, said forces transmitted by the cross member to the occupant of the seat, the ends of the cross member being connected to upper ends of links, the links pivoting on the seat pan framework about an axis stationarily fixed to the framework and passing through lower ends of said links, wherein the movement of said cross member towards the front is in the form of an arc of a circle centered on the fixed axis, defined by the pivoting of the links towards the front, opposing the retention force exerted by the energy dissipation means which are connected to upper ends of the links and near the cross member.

2. Seat pan in accordance with claim 1, wherein the rest position of the cross member is determined so that the cross member is submitted to the forces exerted by the pelvis of the user when the pelvis moves forwards, the cross member beginning to move when said forces reach said threshold, and said energy dissipation means are shaped so as to dissipate energy when the cross member starts to move under the effect of the forces exerted by the user.

3. Seat pan in accordance with claim 2, wherein the energy dissipation means include elements elongated by plastic deformation and connecting the cross member to the seat pan framework, the elements being arranged so as to enable the movement of the cross member towards the front of the seat when the elements elongate and shaped so as to elongate by deforming plastically when the force exerted on the cross member reaches said threshold.

4. Seat pan in accordance with claim 3, wherein the seat pan has an elongatable element on each side of the seat pan.

5. Seat pan in accordance with claim 3, wherein each elongatable element has a transversally corrugated strip.

6. Seat pan in accordance with claim 3, wherein each elongatable element has a strip including transverse cutouts.

7. Seat pan in accordance with claim 6, wherein the cutouts include cuts made in the center part of the strip which do not extend through to the edges of the strip and which move apart by the deformation of the said edges during the elongation of the strip.

8. Seat pan in accordance with claim 3, wherein the elongatable elements are sheet steel strips.

* * * * *